United States Patent
Li

(10) Patent No.: US 8,447,979 B2
(45) Date of Patent: May 21, 2013

(54) METHOD AND APPARATUS FOR BINDING UPDATE BETWEEN MOBILE NODE AND CORRESPONDENT NODE

(75) Inventor: Chunqiang Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 324 days.

(21) Appl. No.: 12/408,474

(22) Filed: Mar. 20, 2009

(65) Prior Publication Data

US 2009/0177887 A1 Jul. 9, 2009

Related U.S. Application Data

(63) Continuation of application No. PCT/CN2007/002790, filed on Sep. 21, 2007.

(30) Foreign Application Priority Data

Sep. 22, 2006 (CN) .......................... 2006 1 0127847

(51) Int. Cl.
*H04L 29/06* (2006.01)
(52) U.S. Cl.
USPC ...................................... 713/170; 455/432.1
(58) Field of Classification Search
USPC ....... 713/170, 171; 380/46, 29, 30; 455/432.1
See application file for complete search history.

(56) References Cited

U.S. PATENT DOCUMENTS

| 7,502,331 | B2* | 3/2009 | Dommety et al. ............ 370/254 |
| 7,502,932 | B2* | 3/2009 | Lee ............................... 713/171 |
| 7,913,082 | B2* | 3/2011 | Kim .............................. 713/162 |
| 2003/0211842 | A1* | 11/2003 | Kempf et al. ................. 455/411 |
| 2003/0225887 | A1* | 12/2003 | Purnadi et al. ............... 709/227 |
| 2004/0236937 | A1* | 11/2004 | Perkins et al. ............... 713/150 |
| 2005/0190734 | A1* | 9/2005 | Khalil et al. ................. 370/338 |
| 2006/0291422 | A1* | 12/2006 | Rochford ..................... 370/331 |
| 2007/0113075 | A1* | 5/2007 | Jo et al. ........................ 713/158 |

(Continued)

FOREIGN PATENT DOCUMENTS

| CN | 1543117 A | 11/2004 |
| CN | 1758651 A | 4/2006 |

(Continued)

OTHER PUBLICATIONS

D. Johnson, "Mobility Support in IPv6", Jun. 2004, p. 1-166.*

(Continued)

*Primary Examiner* — Jung Kim
*Assistant Examiner* — Carlos M De Jesus, Jr.
(74) *Attorney, Agent, or Firm* — Staas & Halsey LLP

(57) ABSTRACT

A method and apparatus for binding update between a mobile node and a correspondent node is disclosed. The method includes: encrypting, by the correspondent node, a parameter for generating a binding management key with a key, and transmitting the encrypted parameter to the mobile node or a home agent which performs binding update on behalf of the mobile node; obtaining, by the mobile node or the home agent, the parameter via decryption, generating a binding management key with the parameter, generating authentication data with the binding management key, and transmitting a binding update message carrying the authentication data to the correspondent node; and verifying, by the correspondent node, the binding update message based on the authentication data, and returning a binding acknowledgement message to the mobile node or the home agent. With the present invention, the security of the binding update process may be improved.

13 Claims, 13 Drawing Sheets

U.S. PATENT DOCUMENTS

| | | | |
|---|---|---|---|
| 2007/0150736 A1* | 6/2007 | Cukier et al. | 713/172 |
| 2008/0137591 A1* | 6/2008 | Hirano et al. | 370/328 |
| 2008/0291885 A1* | 11/2008 | Miao et al. | 370/338 |

FOREIGN PATENT DOCUMENTS

| | | | |
|---|---|---|---|
| CN | 1833412 A | | 9/2006 |
| CN | 20061000541 | | 7/2007 |
| EP | 1 458 163 | | 9/2004 |
| EP | 1 633 107 | | 3/2006 |
| WO | WO2006006706 A1 | | 1/2006 |
| WO | WO 2006/077835 A1 | | 7/2006 |
| WO | WO2007079628 | * | 7/2007 |

OTHER PUBLICATIONS

D. Johnson, "Mobility Support in IPv6", Jun. 2004, p. 1-155 http://www.ietf.org/rfc/rfc3775.txt.*

R. Deng, "Certificate-based Binding Update Protocol", Mar. 2005, p. 1-18 https://tools.ietf.org/html/draft-qiu-mip6-certificated-binding-update-03.*

C. Vogt, "A Taxonomy and Analysis of Enhancement to Mobile IPv6 Route Optimization", May 2007, pg. https://tools.ietf.org/html/rfc4866#page-32.*

J. Arkko, "Mobile IP Version 6 Route Optimization Security Design Background" Dec. 2005, p. 1-54 https://tools.ietf.org/html/rfc4866#page-32.*

M. Roe, "Security of Internet Location Management", Dec. 2002, p. 1-10 http://research.microsoft.com/apps/pubs/default.aspx?id=67324.*

Johnson, D., "Mobility Support in IPv6," rfc3775.txt, The Internet Society, Jun. 2004.

Perkins C., "Securing Mobile IPv6 Route Optimization Using a Static Shared Key," rfc4449.txt, The Internet Society, Jun. 2006.

Arkko, J., "Using IPsec to Protect Mobile IPv6 Signaling Between Mobile Nodes and Home Agents," rfc3776.txt, The Internet Society, Jun. 2004.

Dupont, F. "Using IPsec between Mobile and Correspondent IPv6 Nodes," draft-ietf-mip6-cn-ipsec-03.txt, The Internet Society, Aug. 2006.

Nikander, P., "Mobile IP Version 6 Route Optimization Security Design Background," rfc4225.txt, The Internet Society, Dec. 2005.

Vogt, C., "A Taxonomy and Analysis of Enhancements to Mobile IPv6 Route Optimization" draft-irtf-mobopts-ro-enhancements-08. txt,The Internet Society, May 2006.

Bao, F., Certificate-based Binding Update Protocol (CBU), draft-qiu-mip6-certificated-binding-update-02.txt, The Internet Society, Aug. 2004.

Second Chinese Office Action dated (mailed) Nov. 2, 2010, issued in related Chinese Application No. 200610127847.1 Huawei Technologies Co., Ltd.

First Chinese Office Action dated (mailed) Nov. 6, 2009, issued in related Chinese Application No. 200610127847.1 Huawei Technologies Co., Ltd.

European Patent Office Communication pursuant to Article 94(3) EPC, Examination Report for Application No. 07816406.8-2413/2061200, mailed Nov. 26, 2009, Huawei Technologies Co., Ltd.

Written Opinion of the International Searching Authority (translation) dated (mailed) Dec. 27, 2007, issued in related Application No. PCT/CN2007/002790, filed Sep. 21, 2007, Huawei Technologies Co., Ltd.

Haddad S Krishnan Ericsson Research H Soliman Qualcomm-Flarion W: "Using Cryptographically Generated Addresses (CGA) to secure HMIPv6 Protocol (HMIPv6sec) ; draft-haddad-mipshop-hmipv6-security-05.txt" IETF Standard-Working-Draft, Internet Engineering Task Force, IETF, CH, No. 5, Aug. 7, 2006, XP015046571; ISSN: 0000-0004.

Johnson Rice University C Perkins Nokia Research Center J Arkko Ericsson D: "Mobil ity Support in IPv6; rfc3775. txt" IETF Standard, Internet Engineering Task Force, IETF, CH, Jun. 1, 2004, XP015009555; ISSN: 0000-0003.

European Patent Office Communication of a notice of opposition regarding International Patent Application No. 078164068-2413/2061200; mailing date of Jun. 21, 2011; Huawei Tech Co., Ltd.; (1 pg.).

European Patent Office Communication—Notice of opposition to a European Patent regarding International Patent No. EP 2.061.200B1 (Application No. 07816406.8), dated Sep. 15, 2010; mailing date of Jun. 15, 2011; Huawei Tech Co., Ltd.; (24 pgs.).

English Translation of WO2008/040178, titled: "Method and Apparatus for Binding Update Between Mobile Node and Correspondent Node"; Published Apr. 10, 2008 (42 pgs).

Voct, C. et al.; A Taxonomy and Analysis of Enhancements to Mobile IPv6 Route Optimi9zation (draft-irtf-mobopts-ro-enhancements-08. txt); dated May 5, 2006; Networking Working Group; Internet-Draft Expires Nov. 6, 2006; (32 pgs.).

Bao, F., et al.; Certificate-based Binding Update Protocol (CBU) (draft-qiu-mip6-certified-binding-update-.03.txt); dated Mar. 8, 2005; Networking Working Group; Internet-Draft; Expires Sep. 7, 2005; (17 pgs.).

Nikander, P., et al.; "Mobile IP Version 6 Route Optimization Security Design Background"; dated Dec. 2005; Networking Working Group; Request for Comments: 4225; Category: Informational; (37 pgs.).

Aura, T., et al.; Security of Internet Location Management; (10 pgs.).

Johnson, D., et al.; "Mobility Support in IPv6", dated Jun. 2004; Networking Working Group; Request for Comments: 3775; Category: Standard Tracks; (165 pgs.).

Notice of Reasons for Rejection issue in Japanese Application No. 2009-528580, dated Nov. 29, 2011.

English translation of the international publication WO 2008/040178 for the instant US application, dated Mar. 30, 2009 (Notice of EP Opposition *E1) (42 pages).

Decision Rejecting EP Opposition issued Nov. 8, 2012 in corresponding European Patent application No. 07 816 406.8 (18 pages).

Extended European Search Report (ESSR) issued Aug. 12, 2009 in corresponding European Patent application No. 07 816 406.8 (8 pages).

Communication of Notice of EP Opposition issued Jun. 21, 2011 in corresponding European Patent application No. 07 816 406.8 (1 page).

C. Vogt et al. "A Taxonomy and Analysis of Enhancements to Mobile IPv6 Route Optimization" Network Working Group, Internet Draft, May 5, 2006 (Notice of EP Opposition *E3) (31 pages).

Feing Bao et al. "Certificate-based Binding Update Protocol (CBU)" Network Working Group, Internet Draft, Mar. 8, 2005 (Notice of EP Opposition *E4) (18 pages).

P. Nikander et al. "Mobile IP Version 6 Route Optimization Security Design Background" Network Working Group, Request for Comments: 4225, Category: Informational, Dec. 2005 (Notice of EP Opposition *E6) (38 pages).

Tuomas Aura and Michael Roe, Microsoft Research. Jari Arkko, Ericsson Research NomadicLab "Security of Internet Location Management," Dec. 2002 (Notice of EP Opposition *E7) (10 pages).

D. Johnson et al. "Mobility Support in IPv6" Network working Group, Request for Comments: 3775, Category Standard Track, Jun. 2004 (Notice of EP Opposition *E9) (166 pages).

Notice of Opposition to a European Patent mailed Jun. 15, 2011 in corresponding European Patent application No. 07 816 406.8 (*E1-E9 citations) (28 pages).

Translation of the International Search Report mailed Dec. 27, 2007 in corresponding International Patent application No. PCT/CN2007/002790 (3 pages English Translation).

* cited by examiner

METHOD AND APPARATUS FOR BINDING UPDATE BETWEEN MOBILE NODE AND CORRESPONDENT NODE

CROSS-REFERENCE TO RELATED APPLICATIONS

This application is a continuation of International Application No. PCT/CN2007/002790, filed on Sep. 21, 2007, which claims the benefit of Chinese Patent Application No. 200610127847.1, filed on Sep. 22, 2006, both of which are hereby incorporated by reference in their entireties.

FIELD OF THE INVENTION

The invention relates to the field of communications, and more particularly, to a method and apparatus for binding update between a mobile node and a correspondent node.

BACKGROUND

With rapid development of computer networking technologies and mobile communication computations, there are increasingly higher requirements for the mobility provided by the network. Request for Comments (RFC) 3775 proposes a solution to addressing mobility at the network layer: Mobile Internet Protocol version 6 (IPv6).

Referring to FIG. 1, the configuration of the existing Mobile IPv6 is shown. There are three basic network entities in the Mobile IPv6.

A Mobile Node (MN) is a node which may save an ongoing communication while moving from one link to another link on the network. A communication may be performed with a node as long as the home address of the node is known.

A Correspondent Node (CN) is a peer node communicating with the mobile node, and may be mobile or fixed.

A Home Agent (HA) is a router on the home link, and maintains information such as the current position of an MN which has left its home. The router has a port connected with the home link of the MN. When the MN moves to a foreign link, the HA intercepts the information packets directed to the home address of the MN, and then forwards the packets to the MN through a tunnel mechanism. Also, the HA processes and maintains the current position information of the MN.

A Home Address (HoA) in FIG. 1 is a globally unicast routable address assigned to the MN. The corresponding MN may be accessed always through this address. The Care-of Address (CoA) is a related IP address obtained when the MN moves to a foreign link. An MN may have several care-of addresses at a time.

Referring to FIG. 2, data transfer process for the mobile IPv6 in the conventional art is shown.

As provided in the mobile IPv6 specification, when an MN moves from one link to another, the ongoing communication through the home address is not interrupted. The mobility of a node is transparent to the transport layer and other higher-layer protocols. An MN may be uniquely identified by its home address. When the MN roams to a foreign network, a care-of address may be generated in a certain manner, and is reported to the home agent in a binding update message. When the CN transmits a packet to the MN, the HA may intercept the packet directed to the MN, and forward the packet to the MN in a tunnel mode. When the MN transmits a packet to the CN, the packet is transmitted to the HA in a tunnel mode, and the HA then may de-capsulate the tunnel packet and forward it to the CN.

The above communication forwarded by the HA between the MN and the CN may be referred to as a triangle route mode. In this mode, transmission delay may be caused and the overhead in the header of a communication packet with the MN is substantial. The burden on the home link of the MN is increased, and the route is not optimized.

To solve the above problems, the Mobile IPv6 specification provides a route optimization mode in which a direct communication may be performed between the MN and the CN supporting the Mobile IPv6. To perform a direct communication between the MN and the CN, a communication registration process is performed first between the MN and the CN to accomplish binding update, so that the CN and the HA save information about binding in a binding buffer and the MN saves information about the CN in a binding update list. During the binding update process, the MN sends its address binding information to the CN in a Binding Update (BU) message. To prevent the communication between the MN and the CN from being attacked, it is desirable to protect the BU message.

In the route optimization mode, a Return Routability Procedure (RRP) is introduced into the Mobile IPv6 and may be used to generate a binding management key. The binding management key is used to protect the binding update and binding acknowledgement messages between the MN and the CN.

Referring to FIG. 3, an existing RRP is shown.

When attempting to communicate with the CN in the route optimization mode, the MN transmits a home test initiation (HoTI) message and a care-of test initiation (CoTI) message to the CN (for example, steps 301a and 301b in FIG. 3. There is no strict requirement for the sequence of steps 301a and 301b).

The HoTI message is used to inform the CN of the home address and the Home Init Cookie of the MN, so as to request the CN to provide a home key generation token; the CoTI message is used to inform the CN of the care-of address and the care-of Init Cookie of the MN, so as to request the CN to provide a care-of key generation token.

The HoTI message reaches the CN through the relay of the HA; the CoTI message is transmitted to the CN directly.

The CN generates a home key generation token and a care-of key generation token, which are transmitted to the MN through the returned home test (HoT) message and care-of test (CoT) message respectively (for example, steps 302a and 302b in FIG. 3. There is no strict requirement for the sequence of the two steps).

Upon receipt of the HoTI message, the CN calculates the home key generation token as follows:

Home Keygen Token=First(64, HMAC−SHA1(Kcn, HoA|Nonce|0)).

Upon receipt of the CoTI message, the CN calculates the care-of key generation token as follows:

Care-of Keygen Token=First(64, HMAC−SHA1(Kcn, CoA|Nonce|1)).

In the above equations, Kcn is a key of the CN, and Nonce is a random number generated by the CN.

Then, the CN returns an HoT message carrying the home key generation token, which is relayed by the HA to the MN. The CN also returns a CoT message carrying the care-of key generation token, which is transmitted to the care-of address of the MN directly.

After the MN receives the HoT message and the CoT message, the RRP flow comes to an end. Hereafter, the MN performs a care-of binding update process, including the following steps.

The MN transmits a BU message carrying the binding update information.

Upon receipt of the HoT message and the CoT message, the MN performs a Cookies check. After the check is passed, the home key generation token and the care-of key generation token are extracted, and are used to calculate the binding management key (Kbm) as follows:

$$Kbm=SHA1(\text{Home Keygen Token}|\text{Care-of Keygen Token}).$$

The MN generates a Message Authentication Code (MAC) for the BU message with Kbm, as the authentication data of the BU message, which is shown in steps 303a and 303b of FIG. 3.

The CN returns a binding acknowledgement (BA) message carrying the binding update acknowledgement information (as in step 304 of FIG. 3).

After verifying the BU message, the CN adds an entry for the MN in its binding buffer, generates the MAC in the BA (Binding Acknowledgement) message as the MN, and transmits the message to the MN.

After receiving the BA message and verification is passed, the MN adds an entry for the CN in its binding update list.

When the MN de-registers the binding relationship with the CN, Kbm=SHA1(home key generation token) is used to generate the MAC in the BU message.

In implementation of the present invention, the inventor has found several problems existing in the conventional art.

It can be seen from the above binding update process that the binding management key between the MN and the CN is secure when assuming that the CoT and HoT messages cannot be intercepted simultaneously by an attacker over the links between the HA and the CN and between the MN and the CN. But in fact, an attacker may intercept the CoT and HoT messages by choosing an appropriate position. Moreover, the CoT and HoT messages may be easily obtained if nodes on the two different links cooperate. After obtaining the CoT and HoT messages, the attacker may calculate Kbm, and naturally the BU message may be forged.

Additionally, a malicious node may choose an appropriate position, for example, on a link between the HA and the CN, transmit CoTI and HoTI messages to the CN by imitating the MN via RRP. Due to lack of necessary identity authentication information, the CN cannot identify whether a message is transmitted from a counterfeit MN, and thus cannot generate a suitable binding entry. In particular, when a BU is sent for cancellation of the binding relationship, if a hostile node intercepts the HoT message, it may generate the MAC in the BU message with Kbm=SHA1(home key generation token). Upon receipt of the BU message, the CN may verify the BU with Kbm=SHA1(home key generation token). After the verification is passed, the corresponding binding entry is cancelled. In this way, information exchange between the MN and the CN can only be relayed through the HA, and overloading may be caused on the home network.

In a summary, the method for generating Kbm through RRP has a very limited security.

SUMMARY

Embodiments of the present invention provide a method and an apparatus for binding update between a mobile node and a correspondent node, to solve the problem that the security during the binding update process between the mobile node and the correspondent node is poor according to the conventional arts.

An embodiment of the present invention discloses a method for binding update between a mobile node and a correspondent node, including:

encrypting, by the correspondent node, a parameter for generating a binding management key with a key, and transmitting the encrypted parameter to the mobile node or a home agent which performs binding update on behalf of the mobile node;

obtaining, by the mobile node or the home agent, the parameter via decryption, generating a binding management key with the parameter, generating authentication data with the binding management key, and transmitting a binding update message carrying the authentication data to the correspondent node; and verifying, by the correspondent node, the binding update message based on the authentication data, and returning a binding acknowledgement message to the mobile node or the home agent.

An embodiment of the present invention discloses another method for binding update between a mobile node and a correspondent node, including:

transmitting, by the mobile node or a home agent which performs binding update on behalf of the mobile node, a binding update message carrying authentication data to the correspondent node, the authentication data being a digital signature generated with a key;

generating, by the correspondent node, a binding management key with a parameter generated by the correspondent node after the digital signature is verified with a corresponding key, encrypting the parameter with a key, and transmitting a binding acknowledgement message to the mobile node or the home agent, the binding acknowledgement message carrying the authentication data generated with the binding management key and the encrypted parameter; and obtaining, by the mobile node or the home agent, the parameter via decryption, generating a binding management key with the parameter, verifying the authentication data in the binding acknowledgement message with the binding management key, and accomplishing binding update after the verification is passed.

An embodiment of the present invention discloses a binding update apparatus in a mobile node, including:

a decrypting module, configured to decrypt a received encrypted parameter, the parameter used for generating a binding management key;

a binding management key generating module, configured to generate the binding management key with the decrypted parameter; and an authenticating module, configured to generate authentication data for a binding update message or perform digital signature on the binding update message with the generated binding management key, and to verify a binding acknowledgement message sent from a correspondent node with the binding management key.

An embodiment of the present invention discloses a binding update apparatus in a correspondent node, including:

a parameter generating module, configured to generate a parameter which is used to generate a binding management key;

a binding management key generating module, configured to generate the binding management key with the generated parameter;

an encrypting module, configured to encrypt the generated parameter with a key; and an authenticating module, configured to verify authentication data in a binding update message or a digital signature in the binding update message with the binding management key, and to generate authentication data for a binding acknowledgement message with the binding management key.

An embodiment of the present invention discloses a binding update apparatus in a home agent, including:

a decrypting module, configured to decrypt a parameter sent from a correspondent node, the parameter used for generating a binding management key;

a binding management key generating module, configured to generate the binding management key with the decrypted parameter; and an authenticating module, configured to generate authentication data for a binding update message or perform digital signature on the binding update message with the management key, and to verify a binding acknowledgement message sent from the correspondent node with the binding management key.

According to the above embodiments of the present invention, during a binding update process, the correspondent node for the mobile node encrypts the parameter for generating the binding management key with a key, and transmits the encrypted parameter to the mobile node or the home agent for the mobile node. After decrypting the parameter, the mobile node or the home agent for the mobile node generates the binding management key with the parameter. Therefore, the security is improved for the binding management key, and accordingly the security is improved for the binding update message, and further accordingly the security is improved for the binding update process.

DETAILED DESCRIPTION

Detailed descriptions are made below to the embodiments of the present invention with reference to the accompanying drawings.

In embodiments of the present invention, when an MN initiates a registration with a CN, the binding update protection method to be used is negotiated first. With the binding update protection method, the binding management key may be generated on the basis of a pre-shared key, a public key mechanism, or key exchange, or binding update may be implemented by the HA as an agent. Binding update protection methods (if there are multiple, they be arranged in priority) desired by the MN are carried in the HoTI or/and CoTI messages transmitted from the MN. The CN may determine the method to be used according to the HoTI or/and CoTI messages, and carry information corresponding to the selected method in the HoT or/and CoT messages.

Generally, a protection method with a higher security may be preferred for the IPv6 route optimization. The security levels for protecting the Mobile IPv6 route optimization mode are illustrated in Table 1.

TABLE 1

| Protection mode | Security level |
| --- | --- |
| Pre-shared key mode/two-party public key protection mode | High |
| Single-party public key protection mode | Middle |
| Anonymous key exchange mode | Low |
| RRP generated Kbm mode | Weak |

The First Embodiment

In this embodiment, a method is described in which the MN protects the BU message by using the public key of the MN. This method is applicable to cases where the CN may obtain the public key of the MN.

Figure 1:
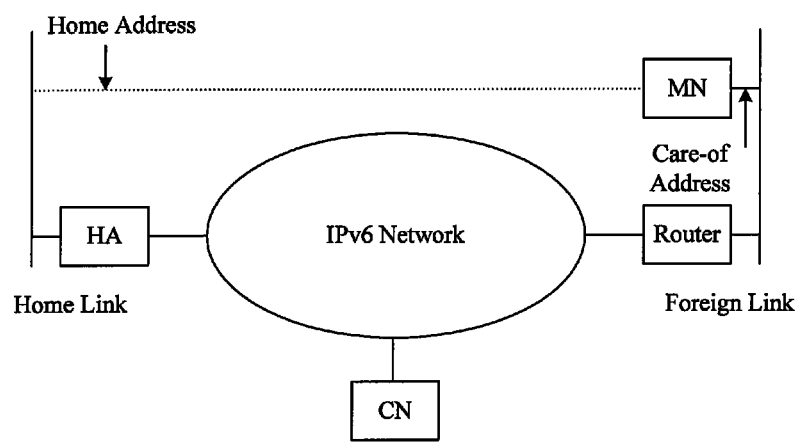
FIG. 1 shows the configuration of the Mobile IPv6 in the conventional art.
Figure 2:
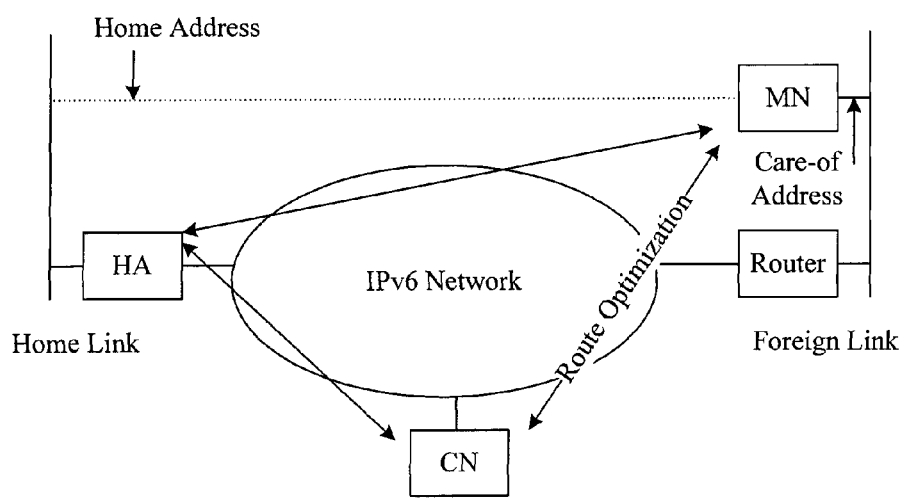
FIG. 2 shows the data transfer process for the Mobile IPv6 in the conventional art.
Figure 3:
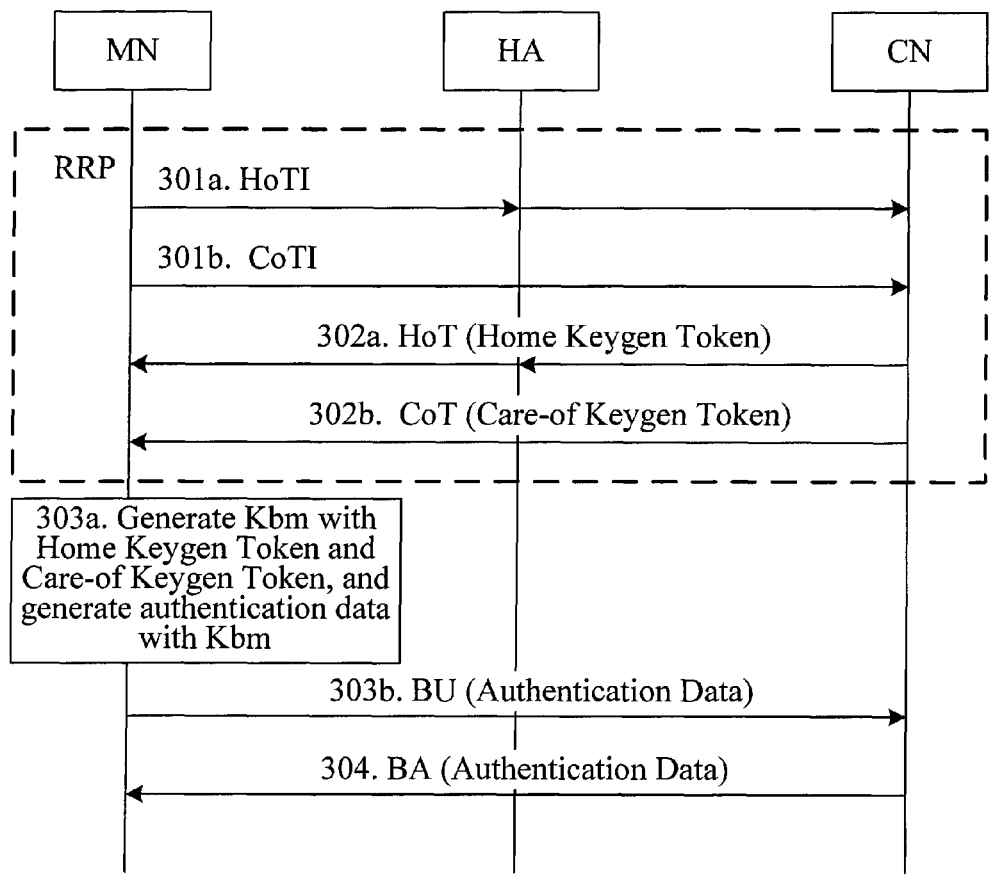
FIG. 3 shows the RRP for the Mobile IPv6 in the conventional art.
Figure 4:
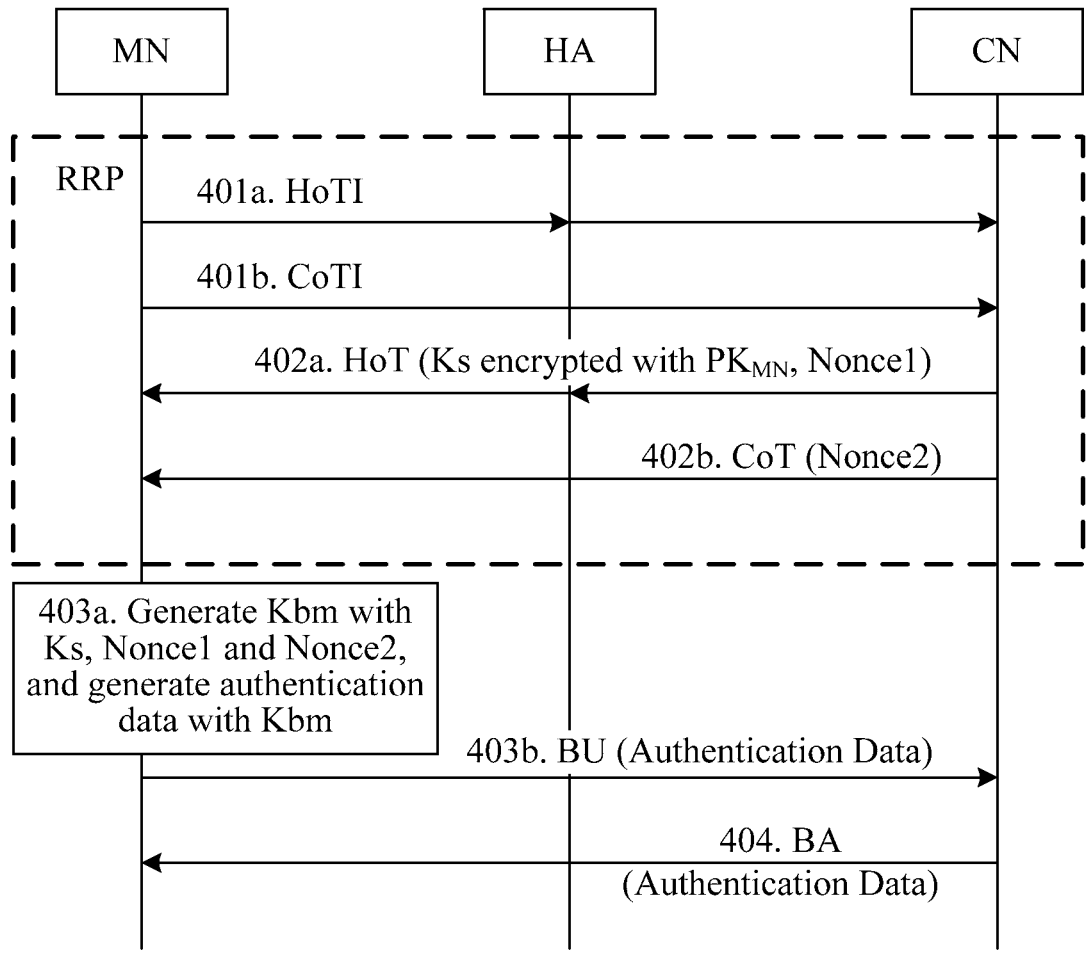
FIG. 4 shows a binding update process according a first embodiment of the present invention.

Referring to FIG. 4, a binding update process according to the first embodiment of the present invention is shown. Specifically, the following steps are included.

At 401a and 401b, the MN transmits an HoT message and a CoTI message to the CN.

The HoTI or/and CoTI messages carry the binding update protection method desired by the MN, including the single-party public key protection mode.

At 402a and 402b, the CN returns an HoT message and a CoT message carrying a parameter Ks encrypted with the public key of the MN to the MN.

The CN determines to use a protection method based on the public key of the MN according to the received HoTI message or/and CoTI message, and obtains the public key $PK_{MN}$ of the MN (alternatively, the public key of the MN may be obtained previously). Then, the CN generates a pseudo random number Ks, which is encrypted with the public key $PK_{MN}$ of the MN and transmitted to the MN in an HoT message.

In this embodiment, a mobility option $E\{PK_{MN}, Ks\}$ is added to the HoT message, for carrying the encrypted Ks, and announcing that the encryption key used is $PK_{MN}$.

The CN may also generate one or more parameters, which are transmitted to the MN in the HoT message or/and CoT message. In this embodiment, the CN may generate two random numbers Nonce1 and Nonce2, which are transmitted to the MN in the HoT message and the CoT message respectively.

At 403a and 403b, the MN decrypts the parameter Ks, generates Kbm with Ks, generates the authentication data in the BU message with Kbm, and transmits the BU message to the CN.

After the MN receives the HoT message and the Cookies check is passed, the parameter Nonce1 is obtained. The mobility option $E\{PK_{MN}, Ks\}$ is decrypted with the private key corresponding to $PK_{MN}$, to obtain the parameter Ks. The MN receives the CoT message and obtains the parameter Nonce2. Now, the MN has accomplished the RRP, and the binding update process will be performed.

The MN may use Ks as Kbm directly, or generate Kbm with Ks and other parameters commonly known to the MN and the CN by applying a Pseudo Random Function (PRF) process:

Kbm=PRF(Ks, Expression).

Here, Expression is formed by a selected combination of Nonce, Cookies, HoA, CoA, CN Address or the like. For example, Kbm may be generated in this embodiment as follows:

Kbm=PRF(Ks, Nonce1|Nonce2|HoA|CoA).

Then, the MN may generate the MAC in the BU message with Kbm, and transmit the BU message to the CN.

At 404, the CN returns a BA message to the MN, and the binding update is accomplished.

Upon receipt of the BU message, the CN may generate Kbm as the MN. The MAC for the BU message is verified with Kbm. After the verification is passed, the CN creates a binding buffer table entry for its binding with the MN, generates the MAC in the BA message with Kbm, and transmits the BA message to the MN. After the BA message is received and the verification is passed, the MN creates a binding buffer table entry for its binding with the CN, and the binding update process between the MN and the CN is accomplished.

When the MN transmits a BU message to the CN to cancel a binding entry in the CN, the MN may use Ks as the binding management key Kbm, or may generate Kbm with Ks and other parameters commonly known to the MN and the CN by using a PRF process, for example: Kbm=PRF(Ks, Nonce1|HoA).

The Second Embodiment

In this embodiment, another method is described in which the MN protects the BU message by using the public key of the MN. This method is applicable to cases where the CN may obtain the public key of the MN.

Figure 5:
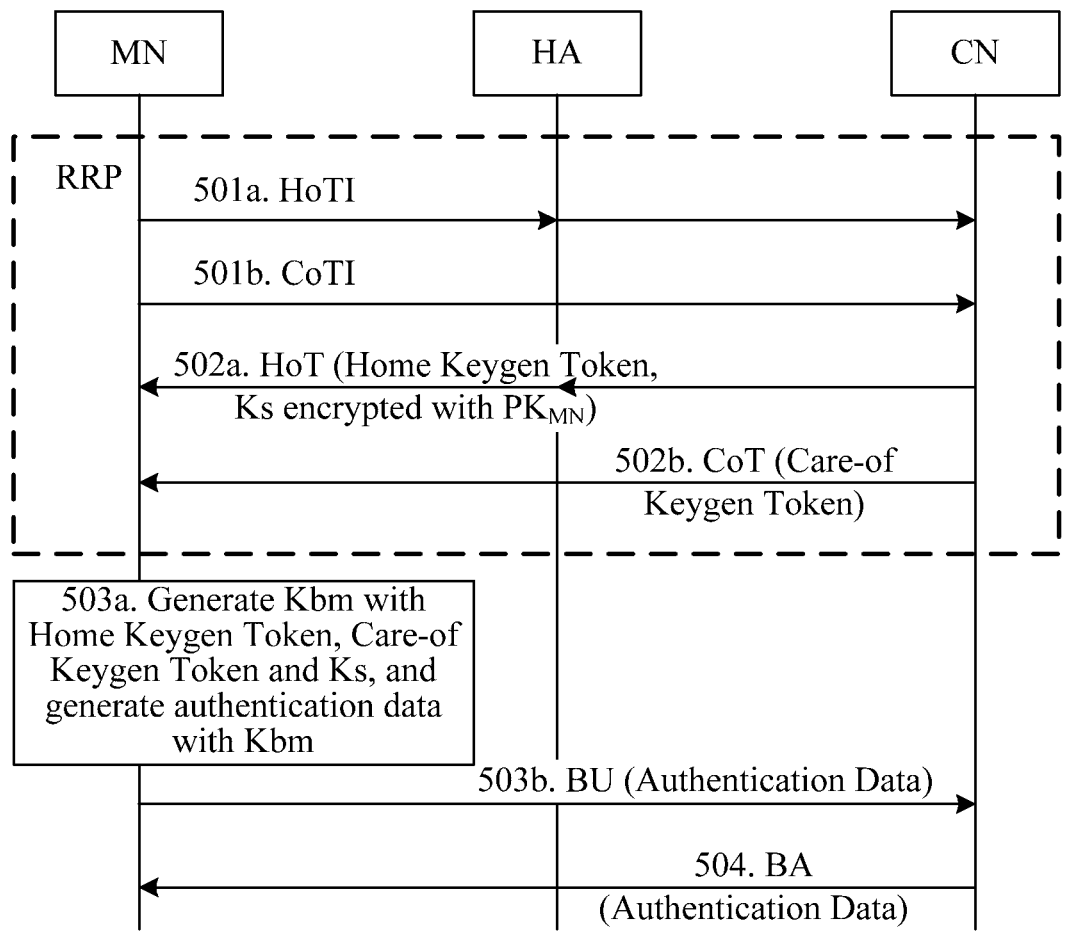
FIG. 5 shows a binding update process according a second embodiment of the present invention.

Referring to FIG. 5, a binding update process according to the second embodiment of the present invention is shown. Specifically, the following steps are included.

At 501a and 501b, the MN transmits an HoTI message and a CoTI message to the CN.

The HoTI or/and CoTI messages carry the binding update protection method desired by the MN, including the single-party public key protection mode.

At 502a and 502b, the CN returns to the MN an HoT message and a CoT message carrying a home key generation token and a care-of key generation token generated by the CN, as well as a parameter Ks encrypted with the public key of the MN.

The CN determines to use a protection method based on the public key of the MN according to the received HoTI message or/and CoTI message, and obtains the public key $PK_{MN}$ of the MN (alternatively, the public key of the MN may be obtained previously). Then, the CN generates the home key generation token and the care-of key generation token as follows:

Home Keygen Token=First(64, HMAC-SHA1(Kcn, HoA|Nonce|0)), and

Care-of Keygen Token=First(64, HMAC-SHA1(Kcn, CoA|Nonce|1)).

The CN also generates a pseudo random number Ks, which is encrypted with the public key $PK_{MN}$ of the MN. Then, the CN transmits the home key generation token and the encrypted Ks to the MN in the HoT message, and transmits the care-of key generation token to the MN in the CoT message.

In this embodiment, a mobility option $E\{PK_{MN}, Ks\}$ is added to the HoT message, for carrying the encrypted Ks and announcing that the encryption key used is $PK_{MN}$.

At 503a and 503b, the MN decrypts the parameter Ks, generates Kbm with Ks, the home key generation token and the care-of key generation token, generates the authentication data in the BU message with Kbm, and transmits a BU message to the CN.

After the MN receives the HoT message and the Cookies check is passed, the home key generation token is obtained. The mobility option $E\{PK_{MN}, Ks\}$ is decrypted with a private key corresponding to $PK_{MN}$, to obtain the parameter Ks. The MN receives the CoT message and obtains the care-of key generation token. Now, the MN has accomplished the RRP, and the binding update process will be performed.

The MN may generate Kbm with Ks and the home key generation token and the care-of key generation token by applying a PRF process as follows:

Kbm=PRF(Ks, Home Keygen Token|Care-of Keygen Token).

Then, the MN may generate the MAC in the BU message with Kbm, and transmit the BU message to the CN.

At 504, the CN returns a BA message to the MN, and the binding update is accomplished.

Upon receipt of the BU message and the verification is passed, the CN creates a binding buffer table entry for its binding with the MN and returns a BA message. After the BA message is received and the verification is passed, the MN creates a binding buffer table entry for its binding with the CN, and the binding update process between the MN and the CN is accomplished.

When the MN transmits a BU message to the CN to cancel a binding entry in the CN, the MN may use Ks as the binding management key Kbm, or may generate Kbm with Ks and other parameters commonly known to the MN and the CN by using a PRF process, for example: Kbm=PRF(Ks, Home Keygen Token).

The Third Embodiment

In this embodiment, a method is described in which the MN protects the BU message by using the public key of the HA.

Figure 6:
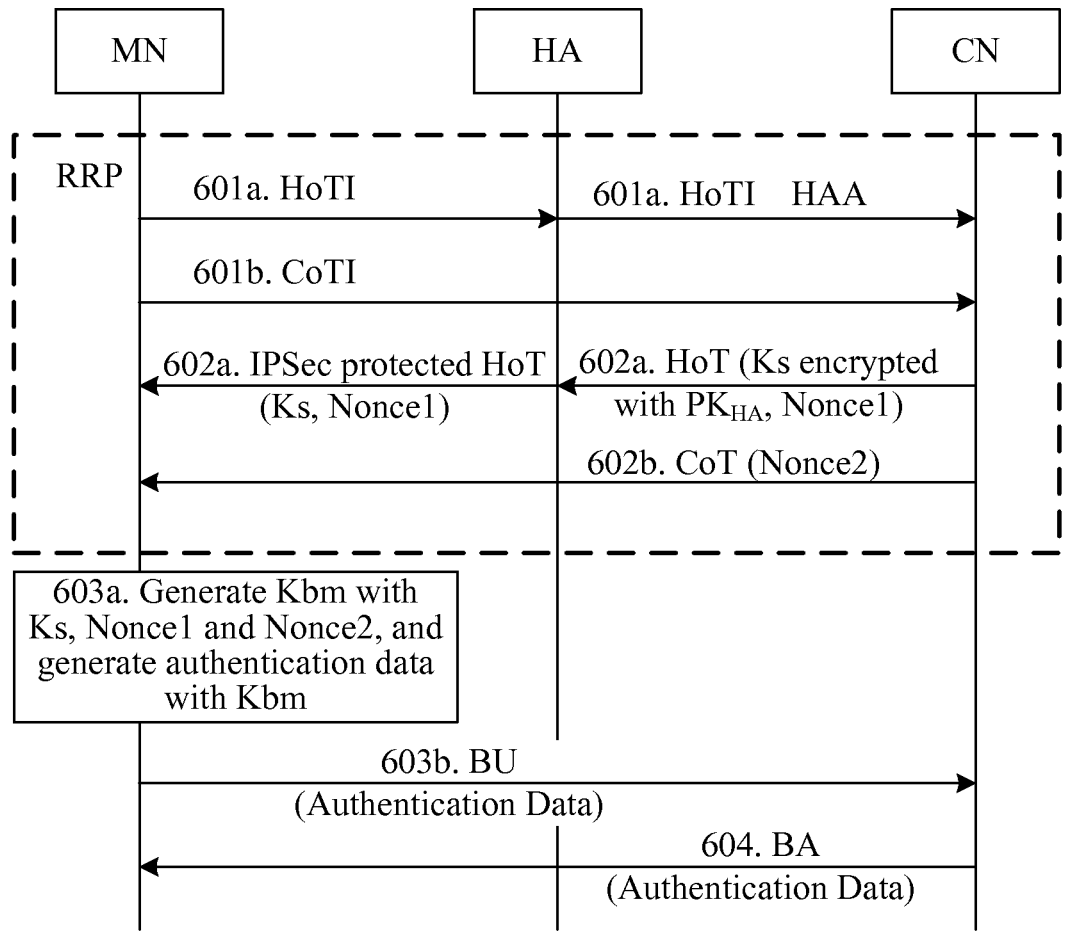
FIG. 6 shows a binding update process according a third embodiment of the present invention.

Referring to FIG. 6, a binding update process according the third embodiment of the present invention is shown. Specifically, the following steps are included.

At 601a and 601b, the MN transmits an HoTI message and a CoTI message to the CN.

The MN transmits an HoTI message to the CN. After intercepting the HoTI message, the HA adds a mobility option HAA (Home Agent Address) and transmits the HoTI message to the CN.

At 602a and 602b, the CN returns an HoT message and a CoT message carrying a parameter Ks to the MN.

Upon receipt of the HoTI message, the CN obtains the public key $PK_{HA}$ of the HA according to the HAA, and generates a pseudo random number Ks. The pseudo random number Ks is then encrypted with the public key $PK_{HA}$ of the HA, and transmitted to the MN in the HoT message.

In this embodiment, a mobility option $E\{PK_{HA}, Ks\}$ is added to the HoT message, for carrying the encrypted Ks and announcing that the key used is $PK_{HA}$.

Also, the CN may generate one or more parameters and transmit the parameters to the MN in the HoT message or/and CoT message. In this embodiment, the CN generates temporary random numbers Nonce1 and Nonce2, and transmits them to the MN in the HoT message and the CoT message respectively.

After the HA intercepts the HoT message and the Cookies check is passed, the parameter Ks is obtained by decrypting $E\{PK_{HA},Ks\}$ with the private key corresponding to $PK_{HA}$. The HoT message carrying Ks and protected by IPSec is forwarded to the MN.

At 603a and 603b, the MN generates Kbm with the parameter Ks, generates the authentication data in the BU message with Kbm, and transmits the BU message to the CN.

After the MN receives the HoT message, the parameter Ks and the parameter Nonce1 are obtained. The MN receives the CoT message and obtains the parameter Nonce2. Now, the MN has accomplished the RRP, and the binding update process will be performed.

The MN may use Ks as Kbm directly, or may generate Kbm with Ks and other parameters commonly known to the MN and the CN by using a PRF process: Kbm=PRF(Ks, Expression).

Here, Expression is formed by a selected combination of Nonce, Cookies, HoA, CoA, CN Address or the like. For example, Kbm may be generated in this embodiment as follows:

Kbm=PRF(Ks, Nonce1|Nonce2|HoA|CoA).

Then, the MN may generate the MAC in the BU message with Kbm, and transmit the BU message to the CN.

At 604, the CN returns a BA message to the MN, and the binding update is accomplished.

After the BU message is received and the verification is passed, the CN creates a binding buffer table entry for its binding with the MN, and returns a BA message. After the BA message is received and the verification is passed, the MN creates a binding buffer table entry for its binding with the CN, and the binding update process between the MN and the CN is accomplished.

When the MN transmits a BU message to the CN to cancel a binding entry in the CN, the MN may use Ks as the binding management key Kbm, or generate Kbm with Ks and other parameters commonly known to the MN and the CN by using a PRF process, for example: Kbm=PRF(Ks, Nonce1|HoA).

The Fourth Embodiment

In this embodiment, another method is described in which the MN protects the BU message by using the public key of the HA.

Figure 7:
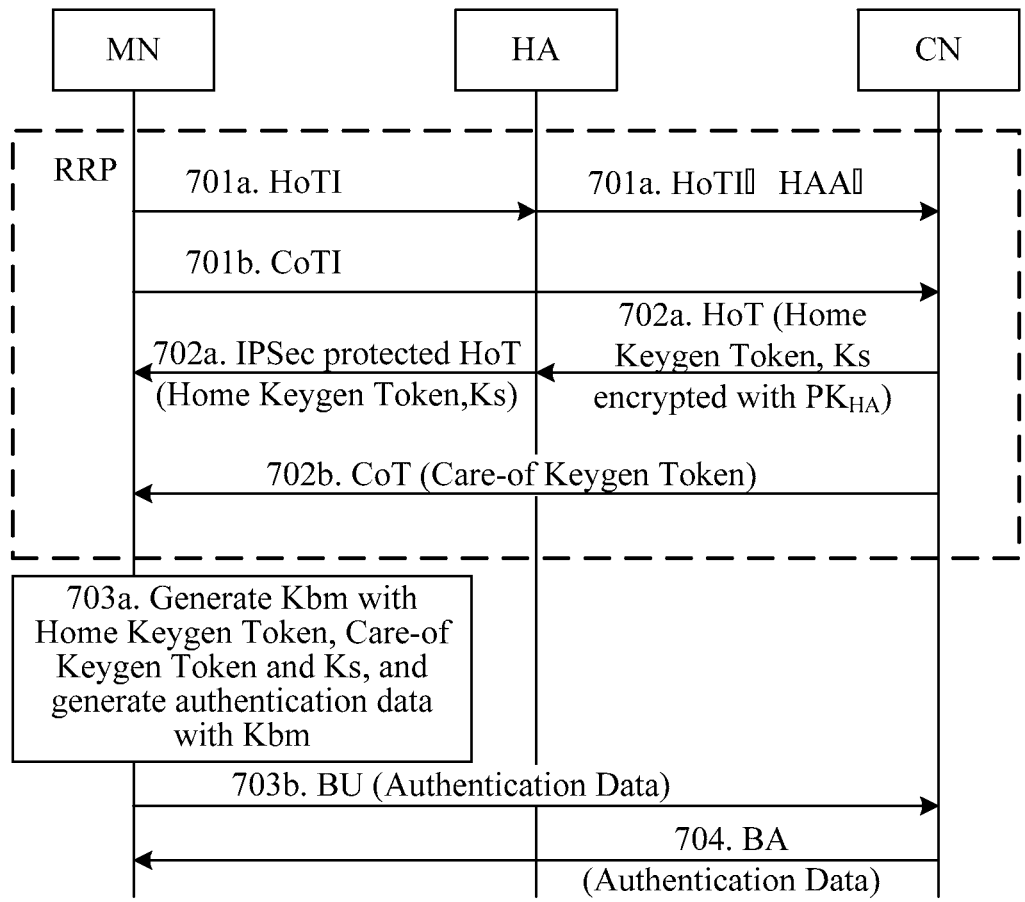
FIG. 7 shows a binding update process according a fourth embodiment of the present invention.

Referring to FIG. 7, a binding update process according the fourth embodiment of the present invention is shown. Specifically, the following steps are included.

At 701a and 701b, the MN transmits an HoTI message and a CoTI message to the CN.

The MN transmits an HoTI message to the CN. After intercepting the HoTI message, the HA adds a mobility option HAA carrying the public key $PK_{HA}$ of the HA, and transmits the HoTI message to the CN.

At 702a and 702b, the CN returns to the MN an HoT message and a CoT message carrying a home key generation token and a care-of key generation token, as well as a parameter Ks.

Upon receipt of the HoTI message, the CN obtains the public key $PK_{HA}$ from the HA according to HAA, and generates a pseudo random number Ks. The pseudo random number Ks is then encrypted with the public key $PK_{HA}$ of the HA. The CN also generates the home key generation token and the care-of key generation token from the received HoTI message and CoTI message:

Home Keygen Token=First(64, HMAC-SHA1(Kcn, HoA|Nonce|0)), and

Care-of Keygen Token=First(64, HMAC-SHA1(Kcn, CoA|Nonce|1)).

Then, the CN transmits Ks and the home key generation token to the MN in the HoT message, and transmits the care-of key generation token to the MN in the CoT message.

In this embodiment, a mobility option $E\{PK_{HA},Ks\}$ is added to the HoT message, for carrying the encrypted Ks and announcing that the key used is $PK_{HA}$.

After the HA intercepts the HoT message and the Cookies check is passed, the parameter Ks is obtained by decrypting $E\{PK_{HA},Ks\}$ with the private key corresponding to $PK_{HA}$. The HoT message carrying Ks and protected by IPSec is forwarded to the MN.

At 703a and 703b, the MN generates Kbm with the parameter Ks, the home key generation token and the care-of key generation token, generates the authentication data in the BU message with Kbm, and transmits a BU message to the CN.

After the MN receives the HoT message, the parameter Ks and the home key generation token are obtained. The MN receives the CoT message and obtains the care-of key generation token. Now, the MN has accomplished the RRP, and the binding update process will be performed.

The MN may generate Kbm with Ks and the home key generation token and the care-of key generation token by using a PRF process as follows:

Kbm=PRF(Ks, Home Keygen Token|Care-of Keygen Token).

Then, the MN may generate the MAC in the BU message with Kbm, and transmit the BU message to the CN.

At 704, the CN returns a BA message to the MN, and the binding update is accomplished.

Upon receipt of the BU message and the verification is passed, the CN creates a binding buffer table entry for its binding with the MN and returns a BA message. After the BA message is received and the verification is passed, the MN creates a binding buffer table entry for its binding with the CN, and the binding update process between the MN and the CN is accomplished.

When the MN transmits a BU message to the CN to cancel a binding entry in the CN, the MN may use Ks as the binding management key Kbm, or may generate Kbm with Ks and other parameters commonly known to the MN and the CN by using a PRF process, for example: Kbm=PRF(Ks, Home Keygen Token).

In the above first to fourth embodiments, the CN may generate Ks based on the HoTI message transmitted from the MN, and then transmit Ks to the MN in the HoT message. Alternatively, the CN may generate Ks based on the CoTI message transmitted from the MN, and then transmit Ks to the MN in the CoT message.

Moreover, to avoid consumption of too much computing resources in the above first to fourth embodiments, the CN may limit the number of BU messages accepted in a unit time, and accordingly the MN node may set a minimum time interval at which BU messages are transmitted and the RRP is performed.

If a pre-shared key exists between the MN and the CN, the route optimization for the Mobile IPv6 may be protected with IPSec, which is similar to the above embodiments. The difference is in that: the CN may generate a key with a pre-shared key with the MN, and use the key to encrypt a pseudo random number Ks generated by the CN; the MN may generate a key with a pre-shared key with the CN by using a method same as in the CN and use the key to decrypt Ks. The time delay is low for the method of protecting route optimization with a pre-shared key. But a good trustiness is required to exist between the CN and the MN, and the users of the CN and the MN need to have an intimate relationship or a basis for establishment of trustiness. Accordingly, this method is limited to particular application scenarios. In this method, the CN may limit the number of BU messages accepted in a unit time to avoid DOS attacks, and accordingly the MN node may set a minimum time interval at which BU messages are transmitted.

When there is no pre-shared key between the MN and the CN, and thus the CN cannot obtain the public key of the MN, the binding management key may be generated by combining key exchange and RRP, and the generated binding management key may be used to protect the route optimization for the Mobile IPv6. With the method for generating the binding management key based on anonymous key exchange, there may be no pre-shared key between the CN and the MN or there is no need to obtain information about the public key. Thus, attacks from the third party initiated through calculation of Kbm based on the intercepted HoT and CoT messages may be prevented.

The above various binding update methods are based on the RRP process. The following embodiments will provide several binding update methods not based on the RRP process.

The Fifth Embodiment

In this embodiment, a binding update method is described in which the HA processes the route optimization on behalf of the MN.

Figure 8:
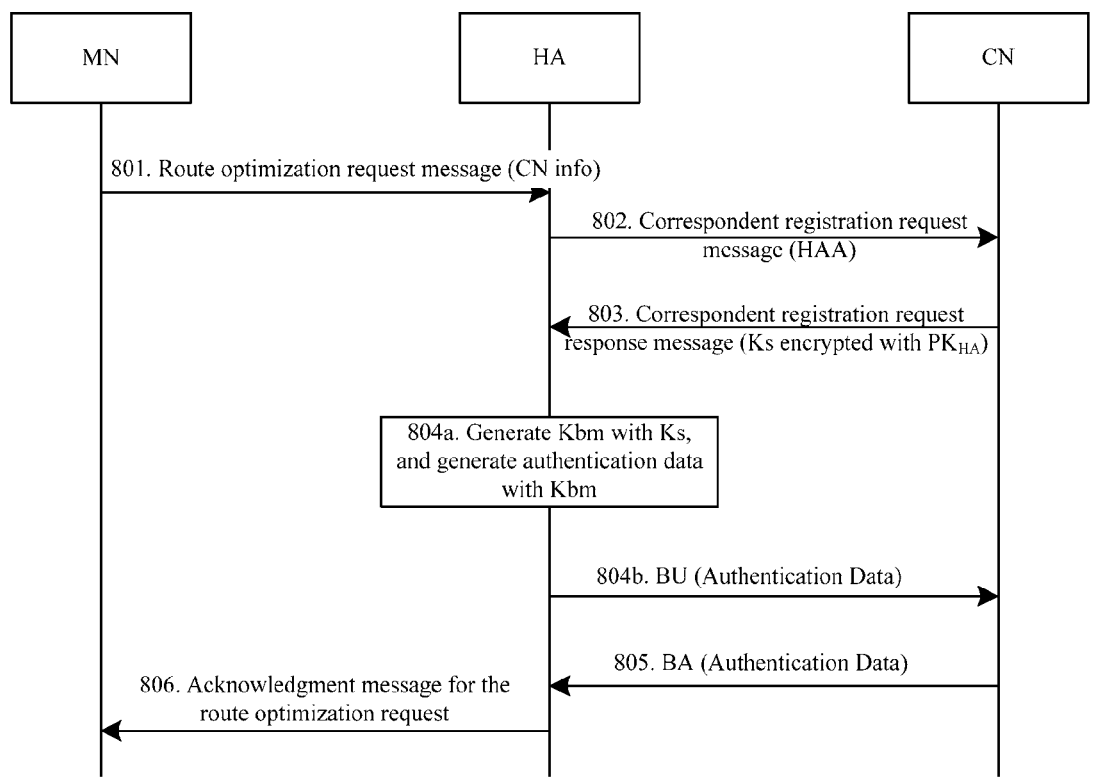
FIG. 8 shows a binding update process according a fifth embodiment of the present invention.

Referring to FIG. 8, a binding update process according the fifth embodiment of the present invention is shown. Specifically, the following steps are included.

At 801, the MN transmits a route optimization request message to the HA, to request the HA to perform a communication registration with the CN on behalf of the MN.

This message is newly added for this embodiment, carrying information related to the CN with which the MN communicates in the route optimization mode (for example, the address of the CN), and the addresses of one or more CNs may be carried. After a home registration is performed, the MN transmits the message to the HA.

At 802, the HA transmits a correspondent registration request message to the CN, to initiate a registration request to the CN on behalf of the MN.

The HA carries its address HAA in the correspondent registration request message so that the CN may obtain the public key of the HA with the address.

At 803, the CN returns a correspondent registration response message carrying an encrypted random number Ks to the HA.

Upon receipt of the registration request message, the CN obtains the public key $PK_{HA}$ of the HA based on the HAA, and generates a random number Ks. Ks is encrypted with the public key of the HA $PK_{HA}$, and transmitted to the HA in the correspondent registration response message. Also, the CN may generate other parameters, such as a temporary random number Nonce, which is transmitted to the HA in the correspondent registration response message.

At 804a and 804b, the HA generates Kbm with the parameter Ks, generates the authentication data in the BU message with Kbm, and transmits the BU message to the CN.

Upon receipt of the correspondent registration response message, the HA obtains the parameter Ks through decryption with the private key corresponding to $PK_{HA}$, and uses Ks as Kbm, or generates Kbm by applying the PRF function to Ks and other parameters commonly known to the HA and the CN:

Kbm=PRF(Ks, Expression), where Expression is formed by a selected combination of Nonce, Cookies, HoA, CoA, CN Address or the like.

The HA generates the MAC in the BU message with Kbm, and transmits the BU message to the CN.

At 805, the CN returns a BA message to the HA, and the HA accomplishes the binding update on behalf of the CN.

The CN may generate Kbm with a method and parameters same as the HA. The BU message is verified with Kbm. After the verification is passed, the CN creates a binding buffer table entry for its binding with the MN, and transmits the BA message carrying the authentication data generated with Kbm.

At 806, the HA returns a response message for step 1 to the MN.

After verifying the BU message, the HA returns to the MN an acknowledgment message for the route optimization request, and informs the MN to create a binding buffer table entry for its binding with the CN. The registration with the correspondent is accomplished.

The Sixth Embodiment

In this embodiment, another binding update method is described in which the HA processes the route optimization on behalf of the MN. This method is applicable to cases where the CN may obtain the public key of the HA.

Figure 9:
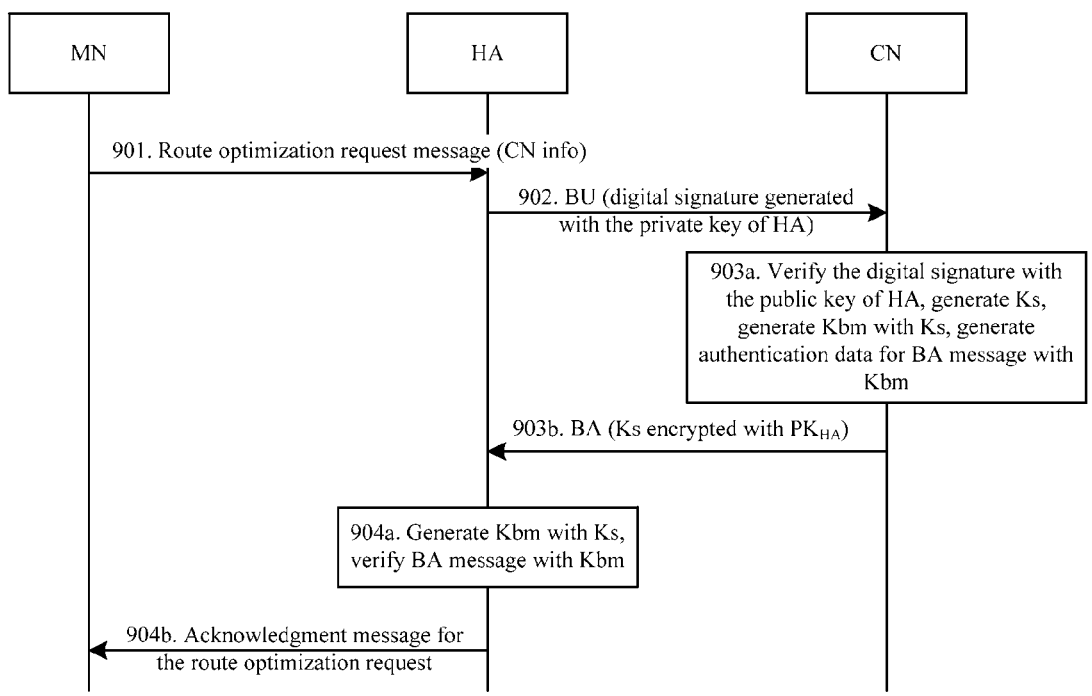
FIG. 9 shows a binding update process according a sixth embodiment of the present invention.

Referring to FIG. 9, a binding update process according the sixth embodiment of the present invention is shown. Specifically, the following steps are included.

At 901, the MN transmits a route optimization request message to the HA, to request the HA to perform a communication registration with the CN on behalf of the MN.

This message is newly added for this embodiment, carrying information related to the CN with which the MN communicates in the route optimization mode (for example, the address of the CN).

At 902, the HA transmits a BU message to the CN, carrying a digital signature generated with the private key of the HA as the authentication data of the BU message.

At 903a and 903b, the CN returns a BA message to the HA, the message carrying a random number Ks encrypted with the public key of the HA.

Upon receipt of the BU message, the CN verifies the digital signature of the BU message with the public key $PK_{HA}$ of the HA. After the verification is passed, the CN creates a binding buffer table entry for its binding with the MN, and transmits a BA message.

A process for generating a BA message may be as follows.

The CN generates a pseudo random number Ks, and uses Ks as Kbm directly, or generates Kbm by applying the PRF function to Ks and other parameters: Kbm=PRF(Ks, Expression), where Expression is formed by a selected combination of Nonce, Cookies, HoA, CoA, CN Address or the like.

Then, the CN encrypts Ks with the public key $PK_{HA}$ of the HA, generates the MAC in the BU message with Kbm, and transmits the BA message carrying the encrypted Ks to the HA. If a parameter unknown to the HA is used for generation of Kbm, such as a temporary random number Nonce generated by the CN, the parameter is also carried in the BA message and transmitted to the HA.

At 904a and 904b, the HA verifies the BA message and returns a response message for step 1 to the MN.

After receiving the BA message, the HA obtains the parameter Ks through decryption with the private key corresponding to $PK_{HA}$, and then Kbm may be generated with a method and parameters same as the CN. Kbm is used to verify the BA message. After the verification is passed, the HA transmits to the MN a response message for the route optimization request message transmitted from the MN at step 1, and informs the MN to create a binding buffer table entry for its binding with the CN. The registration with the correspondent is accomplished.

The Seventh Embodiment

In this embodiment, a binding update method is described in which a direct communication may be performed between the MN and the CN. This method is applicable to cases where the CN may obtain the public key of the MN.

Figure 10:
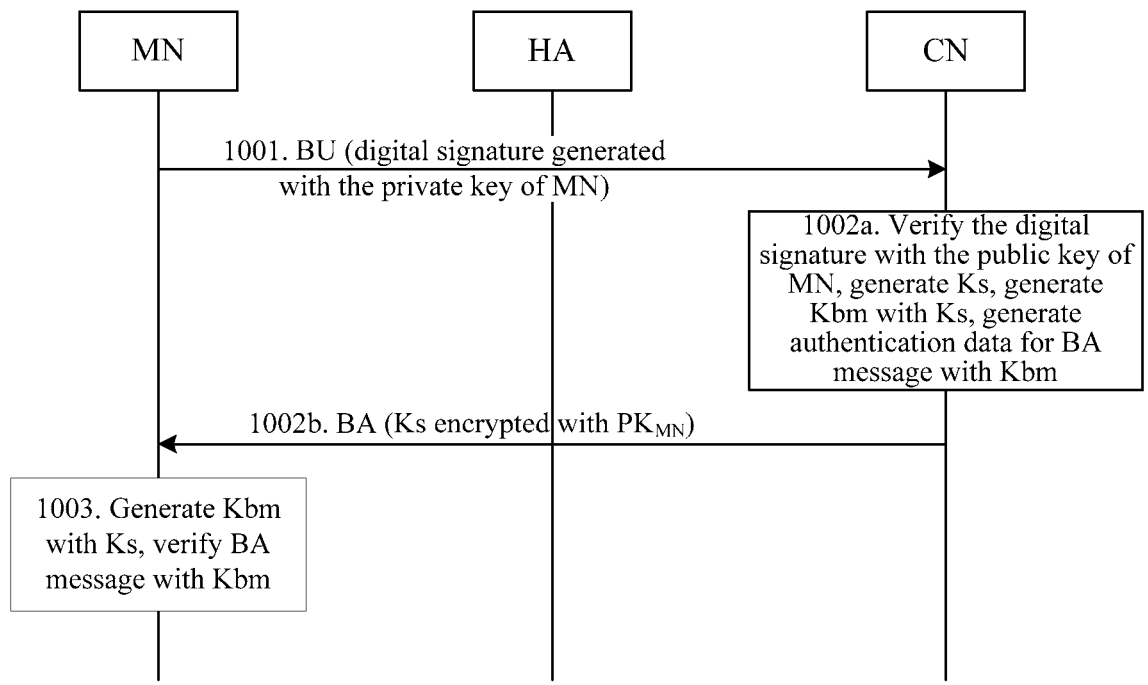
FIG. 10 shows a binding update process according a seventh embodiment of the present invention.

Referring to FIG. 10, a binding update process according the seventh embodiment of the present invention is shown. Specifically, the following steps are included.

At 1001, the MN transmits a BU message to the CN, carrying a digital signature generated with the private key of the MN as the authentication data of the BU message.

At 1002*a* and 1002*b*, the CN returns a BA message carrying a random number Ks encrypted with the public key of the MN.

Upon receipt of the BU message, the CN verifies the digital signature in the BU message with the public key $PK_{MN}$ of the MN. After the verification is passed, the CN creates a binding buffer table entry for its binding with the MN, and returns a BA message.

A process for generating a BA message may be as follows.

The CN generates a pseudo random number Ks, and uses Ks as Kbm directly, or generates Kbm by applying the PRF function to Ks and other parameters: Kbm=PRF(Ks, Expression), where Expression is formed by a selected combination of Nonce, Cookies, HoA, CoA, CN Address or the like.

Then, the CN encrypts Ks with the public key $PK_{MN}$ of the MN, generates the MAC in the BU message with Kbm, and transmits the BA message carrying the encrypted Ks to the HA. If a parameter unknown to the MN is used for generation of Kbm, such as a temporary random number Nonce generated by the CN, the parameter is also carried in the BA message and transmitted to the MN.

At 1003, the MN verifies the integrity and the authenticity of the BA message, and the binding update is accomplished.

After receiving the BA message, the MN obtains the parameter Ks through decryption with the private key corresponding to $PK_{MN}$, and then Kbm may be generated with a method and parameters same as the CN. Kbm is used to verify the BA message. After the verification is passed, the MN creates a binding buffer table entry for its binding with the CN. The registration with the correspondent is accomplished.

In the above embodiments, various binding update processes are described during the communication registration process of the MN and the CN. After binding update is accomplished, the MN and the CN have to update Kbm which protects the BU message. To avoid too many cryptography calculations, when the MN maintains a communication with the original CN and a new Kbm is needed to protect the BU message, only the CoTI/CoT step of the RRP process may be performed to inform the CN of the new CoA. A new binding management key Next_Kbm may be generated as follows:

Next_Kbm=PRF(Kbm, Expression), or

Next_Kbm=PRF(Ks, Expression), where Expression is formed by a selected combination of Nonce, Cookies, HoA, CoA, CN Address or the like. To prevent the replay attack, the parameters at least include the Nonce or Cookies generated by the CN.

When the MN maintains a communication with the original CN and the CoA keeps unchanged but a new Kbm is needed to protect the BU message, the RRP may not be performed and a new binding management key Next_Kbm may be generated as follows.

Next_Kbm=PRF(Kbm, Expression), or

Next_Kbm=PRF(Ks, Expression), where Expression is formed by a selected combination of Nonce, Cookies, HoA, CoA, CN Address or the like. To prevent the replay attack, the parameters at least include a Nonce which is generated by the MN and transmitted to the CN in the BU message.

Embodiments of the present invention also provide binding update apparatuses within a mobile node, a correspondent node and a home agent, respectively.

Figure 11:
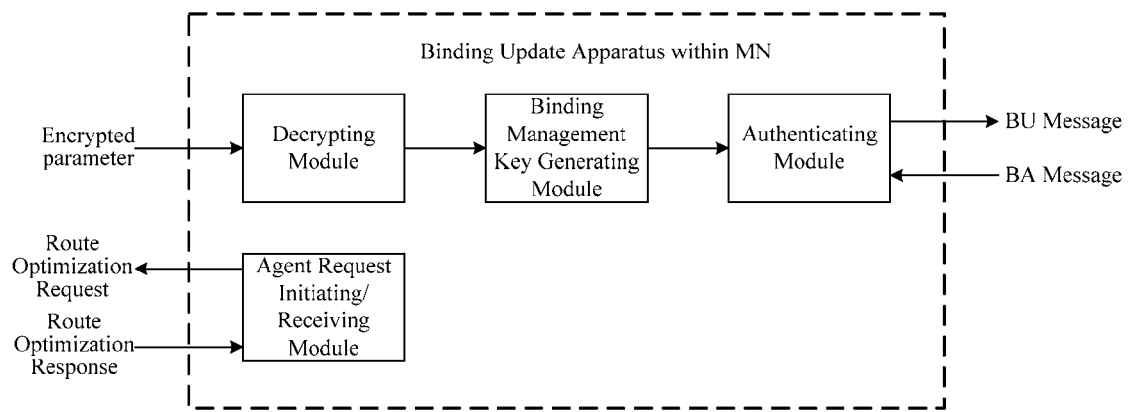
FIG. 11 is a block diagram showing the configuration of a binding update apparatus within a mobile node according to an embodiment of the present invention.

Referring to FIG. 11, the configuration of a binding update apparatus within a mobile node is shown according to an embodiment of the present invention. The apparatus includes a decrypting module, a binding management key generating module, and an authenticating module. Optionally, an agent request initiating/receiving module may be included.

The decrypting module is configured to decrypt a received encrypted parameter, the parameter used for generating a binding management key. The binding management key generating module is configured to generate a binding management key with the decrypted parameter. The authenticating module is configured to generate authentication data for a binding update message with the generated binding management key, and to verify a binding acknowledgement message sent from a correspondent node with the binding management key. The authenticating module may be further configured to perform digital signature on the binding update message.

The agent request initiating/receiving module is configured to transmit a route optimization request to a home agent on behalf of the mobile node and to receive a response message for the route optimization request returned from the home agent so as to perform binding update.

Figure 12:
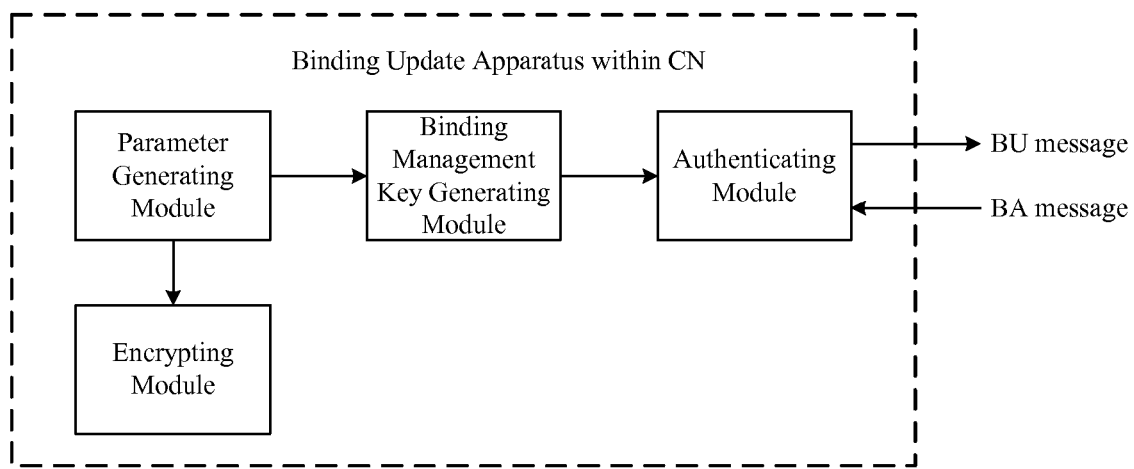
FIG. 12 is a block diagram showing the configuration of a binding update apparatus within a correspondent node according to an embodiment of the present invention.

Referring to FIG. 12, the configuration of a binding update apparatus within a correspondent node is shown according to an embodiment of the present invention. The apparatus includes a parameter generating module, a binding management key generating module, an encrypting module, and an authenticating module.

The parameter generating module is configured to generate a parameter which is used to generate a binding management key. The binding management key generating module is configured to generate a binding management key with the generated parameter. The encrypting module is configured to encrypt the generated parameter with a key. The authenticating module is configured to verify the authentication data in a binding update message with the binding management key, and to generate authentication data for a binding acknowledgement message with the binding management key. The authenticating module may be further configured to verify the digital signature in the binding update message.

Figure 13:
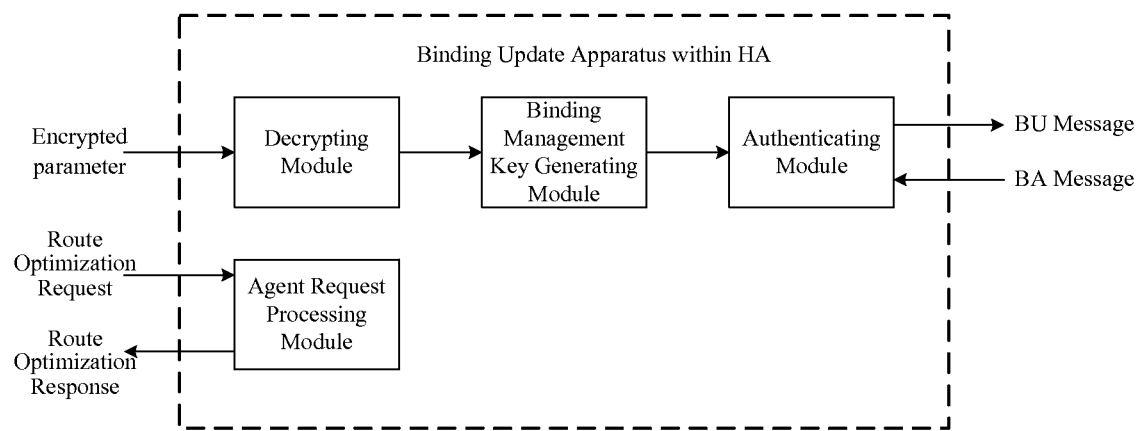
FIG. 13 is a block diagram showing the configuration of a binding update apparatus within a home agent according to an embodiment of the present invention.

Referring to FIG. 13, the configuration of a binding update apparatus within a home agent is shown according to an embodiment of the present invention. The apparatus includes a decrypting module, a binding management key generating module, and an authenticating module. Optionally, an agent request processing module may be included.

The decrypting module is configured to decpypt a parameter sent from a correspondent node, the parameter used for generating a binding management key. The binding management key generating module is configured to generate a binding management key with the decrypted parameter. The authenticating module is configured to generate authentication data for a binding update message with the management key, and to verify a binding acknowledgement message sent from the correspondent node with the binding management key. Also, the authenticating module may be configured to perform digital signature on the binding update message.

The agent request processing module is configured to process a route optimization request initiated from a mobile node, and to return a response message for the route optimization request to the mobile node after the home agent accomplishes the route optimization on behalf of the mobile node. In this way, the mobile node is informed of the binding update accomplishment.

As described above, according to the embodiments of the present invention, a parameter for generating a binding management key is encrypted with a key during the binding update process, which improves the security of the binding management key, accordingly improves the security of the binding update message, and further accordingly improves the security of the binding update process. In the embodiments of the present invention, many methods are provided to encrypt the parameter for generation of the binding management key, which improves the flexibility of the system. An embodiment of the present invention provides a method with which the home agent of the mobile node performs binding update on behalf of the mobile node so that a mobile node having limited functions may perform binding update with the correspondent node. An embodiment of the present invention provides a method with which binding update not based on RRP may be performed between the mobile node and the correspondent node. In this method, the binding update message is verified with the digital signature, and the parameter for generating the binding management key is encrypted.

Obviously, those skilled in the art may make various changes and variations without departing from the spirit and scope of the invention. As such, if these changes and variations to the present invention fall within the scope of the appended claims and the equivalents, the present invention is intended to cover these changes and variations.

What is claimed is:

1. A method for binding update between a mobile node and a correspondent node, comprising:
receiving, by the correspondent node, an initiation message from the mobile node, the initiation message including a home agent address inserted by a home agent of the mobile node when the initiation message is transmitted from the mobile node to the correspondent node;
determining, by the correspondent node, to use a protection method according to the initiation message from the mobile node, the protection method being selected from at least one of a two-party protection mode or a single-party protection mode;
obtaining, by the correspondent node, a public key of the home agent of the mobile node according to the home agent address in the initiation message;
encrypting, by the correspondent node, a parameter for generating a binding management key with the public key of the home agent;
transmitting, by the correspondent node, the encrypted parameter to the home agent, wherein the home agent decrypts the encrypted parameter with its private key and sends the decrypted parameter to the mobile node;
verifying, by the correspondent node, a binding update message based on authentication data, wherein the binding update message carrying the authentication data is sent from the mobile node, the authentication data being generated with the binding management key, the binding management key being generated with the decrypted parameter received from the home agent;
creating, by the correspondent node, a binding buffer table entry for its binding with the mobile node after the verification is passed; and
returning, by the correspondent node, a binding acknowledgement message to the mobile node.

2. The method according to claim 1, wherein the step of encrypting, by the correspondent node, the parameter for generating the binding management key with the public key of the home agent, and transmitting the encrypted parameter to the home agent, comprises:
generating the parameter after the correspondent node receives a home test initiation message transmitted from the mobile node, encrypting the parameter with the public key of the home agent, and transmitting the encrypted parameter to the home agent in a returned home test message.

3. The method according to claim 1,
wherein the steps of encrypting the parameter for generating the binding management key with the public key of the home agent, and transmitting the encrypted parameter to the home agent comprise:
generating the parameter after the correspondent node receives a request message transmitted from the home agent;
encrypting the parameter with the public key of the home agent; and
transmitting the encrypted parameter to the home agent in a returned response message.

4. The method according to claim 2, wherein the returned home test message comprises a mobility option for carrying the encrypted parameter and announcing that a key used is the public key of the home agent.

5. The method according to claim 2, further comprising:
generating, by the correspondent node, two temporary random numbers; and
transmitting the two temporary random numbers to the mobile node in the home test message and a care-of test message, respectively,
wherein the binding management key is generated with the decrypted parameter received from the home agent, the two temporary random numbers, the home address of the mobile node, and the care of address of the mobile node.

6. The method according to claim 2, further comprising:
generating, by the correspondent node, a home key generation token from the home test message;
generating, by the correspondent node, a care-of key generation token from a care-of test initiation message transmitted from the mobile node; and
transmitting the home key generation token and the care-of key generation token to the mobile node in the home test initiation message and a care-of test message, respectively,
wherein the binding management key is generated with the decrypted parameter received from the home agent, the home key generation token and the care-of key generation token.

7. A method for binding update between a mobile node and a correspondent node, comprising:
receiving, by the correspondent node, an initiation message from the mobile node, the initiation message including a home agent address inserted by a home agent of the mobile node when the initiation message is transmitted from the mobile node to the correspondent node;

determining, by the correspondent node, to use a protection method according to the initiation message from the mobile node, the protection method being selected from at least one of a two-party protection mode or a single-party protection mode;

receiving, by the correspondent node, a binding update message carrying authentication data sent from the home agent which performs binding update on behalf of the mobile node, wherein the authentication data is a digital signature generated with a private key of the home agent;

verifying, by the correspondent node, the digital signature with a public key of the home agent;

creating, by the correspondent node, a binding buffer table entry for its binding with the mobile node after the verification is passed;

generating, by the correspondent node, a first binding management key with a parameter generated by the correspondent node;

encrypting, by the correspondent node, the parameter with the public key of the home agent;

transmitting, by the correspondent node, a binding acknowledgement message to the home agent, the binding acknowledgement message carrying the encrypted parameter and authentication data generated with the binding management key; and obtaining, by the home agent, the parameter via decryption, generating a second binding management key with the parameter, verifying the authentication data in the binding acknowledgement message with the binding management key generated by the home agent, and accomplishing binding update after the verification is passed.

8. A binding update apparatus for use in a correspondent node, the binding update apparatus comprising:

an obtaining module, configured to:
receive an initiation message from a mobile node, the initiation message including a home agent address inserted by a home agent of the mobile node when the initiation message is transmitted from the mobile node to the correspondent node,
determine to use a protection method according to the initiation message from the mobile node, the protection method being selected from at least one of a two-party protection mode or a single-party protection mode, and
obtain a public key of the home agent of the mobile node according to the home agent address;

an encrypting module, configured to encrypt a parameter for generating a binding management key with the public key of the home agent;

a transmitting module, configured to transmit the encrypted parameter to the home agent which decrypts the encrypted parameter with its private key and sends the decrypted parameter to the mobile node;

an authenticating module, configured to verify a binding update message based on authentication data, wherein the binding update message carrying the authentication data is sent from the mobile node or the home agent, the authentication data being generated with the binding management key, the binding management key being generated with the parameter obtained via decryption;

a creating module, configured to create a binding buffer table entry for its binding with the mobile node after the verification is passed; and a returning module, configured to return a binding acknowledgement message to the mobile node or the home agent.

9. A binding update apparatus for use in a home agent, the binding update apparatus comprising:
a receiving module;
a transmitting module;
a decrypting module;
a binding management key generating module; and
an authenticating module,
wherein:
the transmitting module is configured to transmit a correspondent registration request message carrying an address of the home agent to a correspondent node;
the receiving module is configured to receive a correspondent registration response message carrying a parameter encrypted with a public key of the home agent, the correspondent registration response being transmitted from the correspondent node;
the decrypting module is configured to obtain the parameter via decryption;
the binding management key generating module is configured to generate a binding management key with the parameter; and
the authenticating module is configured to generate authentication data, send a binding update message carrying the authentication data to the correspondent node, and verify a binding acknowledgement message sent from the correspondent node with the binding management key.

10. The apparatus according to claim 9, further comprising:
an agent request processing module, configured to process a route optimization request initiated from a mobile node before the transmitting module transmits the correspondent registration request message to the correspondent node, and to return a response message for the route optimization request to the mobile node after the authenticating module verifies the binding acknowledgement message so that the mobile node accomplishes binding update.

11. A binding update apparatus for use in a correspondent node, the binding update apparatus comprising:
a receiving module, configured to:
receive an initiation message from a mobile node, the initiation message including a home agent address inserted by a home agent of the mobile node when the initiation message is transmitted from the mobile node to the correspondent node;
determine to use a protection method according to the initiation message from the mobile node, the protection method being selected from at least one of a two-party protection mode or a single-party protection mode: and
receive a binding update message carrying authentication data sent from the home agent which performs binding update on behalf of the mobile node,
wherein the authentication data is a digital signature generated with a private key of the home agent;
a verifying module, configured to verify the digital signature with a public key of the home agent;
a creating module, configured to create a binding buffer table entry for its binding with the mobile node after the verification is passed;
a generating module, configured to generate a parameter and generate a binding management key with the parameter;

an encrypting module, configured to encrypt the parameter with the public key of the home agent; and a transmitting module, configured to transmit a binding acknowledgement message to the home agent, the binding acknowledgement message carrying the encrypted parameter and an authentication data generated with the binding management key.

12. A binding update apparatus for use in a home agent, the binding update apparatus comprising:
   a receiving module;
   a transmitting module;
   a decrypting module;
   a binding management key generating module; and
   an authenticating module,
   wherein:
   the transmitting module is configured to transmit a binding update message to a correspondent node, the binding update message carrying a digital signature generated with a private key of the home agent,
   the receiving module is configured to: receive a binding acknowledgement message transmitted from the correspondent node, the binding acknowledgement message carrying a parameter encrypted with a public key of the home agent,
   the decrypting module is configured to obtain the parameter via decryption,
   the binding management key generating module is configured to generate the a binding management key with the parameter, and
   the authenticating module is configured to verify the binding acknowledgement message with the binding management key.

13. The apparatus according to claim 12, further comprising: an agent request processing module, configured to process a route optimization request initiated from a mobile node before the transmitting module transmits the binding update message to the correspondent node, and to return a response message for the route optimization request to the mobile node after the authenticating module verifies the binding acknowledgement message so that the mobile node accomplishes binding update.

* * * * *

UNITED STATES PATENT AND TRADEMARK OFFICE
CERTIFICATE OF CORRECTION

Page 1 of 1

PATENT NO.      : 8,447,979 B2
APPLICATION NO. : 12/408474
DATED           : May 21, 2013
INVENTOR(S)     : Chunqiang Li It is certified that error appears in the above-identified patent and that said Letters Patent is hereby corrected as shown below:

In the Claims

Column 20, Line 7, In Claim 12, after "generate", delete "the".

Signed and Sealed this
Twenty-fourth Day of March, 2015

Michelle K. Lee
*Director of the United States Patent and Trademark Office*